(12) United States Patent
Owens et al.

(10) Patent No.: US 7,612,300 B2
(45) Date of Patent: Nov. 3, 2009

(54) HINGE FOR CABLE TROUGH COVER

(75) Inventors: Ryan J. Owens, Eden Prairie, MN (US); Jeffrey J. Norris, Bloomington, MN (US); Thomas L. Barnes, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/183,195

(22) Filed: Jul. 31, 2008

(65) Prior Publication Data
US 2009/0032280 A1 Feb. 5, 2009

Related U.S. Application Data

(60) Provisional application No. 60/953,376, filed on Aug. 1, 2007.

(51) Int. Cl.
*H02G 3/04* (2006.01)
(52) U.S. Cl. ............ 174/480; 174/481; 174/68.1; 174/72 A; 52/220.1; 439/207; 385/134
(58) Field of Classification Search ............ 174/480, 174/481, 68.1, 68.3, 72 A, 72 C, 95–98, 135, 174/101; 52/220.1, 220.5, 220.7; 385/100, 385/134; 439/207
See application file for complete search history.

(56) References Cited

U.S. PATENT DOCUMENTS

| 3,786,171 A | 1/1974 | Shira |
| D269,968 S | 8/1983 | Moura |
| 4,406,379 A | 9/1983 | Anderson et al. |
| 4,423,284 A | 12/1983 | Kaplan |
| 4,634,019 A | 1/1987 | Pherigo |

(Continued)

FOREIGN PATENT DOCUMENTS

EP 1 033 800 A1 9/2000

(Continued)

OTHER PUBLICATIONS

"FiberGuide® System Installation Manual," *ADC Telecommunications, Inc.*, ADCP-95-005, Issue 1, front cover, pp. i-viii, pp. 5-2 to 5-15, and back cover (Sep. 2002).

(Continued)

*Primary Examiner*—Dhiru R Patel
(74) *Attorney, Agent, or Firm*—Merchant & Gould P.C.

(57) ABSTRACT

A cable trough system includes a trough member including a base wall and first and second sidewalls extending from the base wall to form a trough. The system also includes a cover including a main body with a first end and a second end, and first and second hinge portions coupled to the first and second ends of the main body. Each of the first and second hinge portions includes a first member that extends to an end positioned to contact an inner surface of the first sidewall, a second member that defines an arm that is positioned to at least partially contact the first sidewall, and an extension member that extends from the second member in a direction opposite to that of the arm. The first and second members have a space therebetween sized to receive a portion of the first sidewall.

20 Claims, 16 Drawing Sheets

U.S. PATENT DOCUMENTS

| | | | |
|---|---|---|---|
| 4,640,314 | A | 2/1987 | Mock |
| 4,942,271 | A | 7/1990 | Corsi et al. |
| 5,004,192 | A | 4/1991 | Handler |
| 5,134,250 | A | 7/1992 | Caveney et al. |
| 5,235,136 | A | 8/1993 | Santucci et al. |
| 5,669,106 | A | 9/1997 | Daoud |
| 5,728,976 | A | 3/1998 | Santucci et al. |
| 5,942,729 | A | 8/1999 | Carlson, Jr. et al. |
| 6,084,180 | A | 7/2000 | DeBartolo, Jr. et al. |
| 6,107,575 | A | 8/2000 | Miranda |
| 6,107,576 | A | 8/2000 | Morton et al. |
| D430,543 | S | 9/2000 | Rohder |
| 6,288,331 | B1 | 9/2001 | Wirthwein et al. |
| 6,323,421 | B1 | 11/2001 | Pawson et al. |
| 6,333,461 | B1 | 12/2001 | Marcou et al. |
| 6,348,660 | B1 | 2/2002 | Gutgsell et al. |
| 6,380,484 | B1 | 4/2002 | Theis et al. |
| 6,437,243 | B1 | 8/2002 | VanderVelde et al. |
| 6,437,244 | B1 | 8/2002 | Vander Velde |
| 6,459,038 | B1 | 10/2002 | Waszak et al. |
| 6,476,327 | B1 | 11/2002 | Bernard et al. |
| D473,850 | S | 4/2003 | Rouleau et al. |
| 6,664,467 | B1 * | 12/2003 | de la Borbolla ............ 174/503 |
| 6,668,123 | B1 | 12/2003 | Ellison et al. |
| 6,677,533 | B2 | 1/2004 | Bernard et al. |
| 6,693,238 | B2 | 2/2004 | Jadaud et al. |
| 6,792,877 | B2 | 9/2004 | Gutgsell et al. |
| 6,803,519 | B2 | 10/2004 | de la Borbolla et al. |
| 6,810,191 | B2 | 10/2004 | Ferris et al. |
| 6,835,891 | B1 | 12/2004 | Herzog et al. |
| RE38,709 | E | 3/2005 | Gutgsell et al. |
| 6,903,265 | B1 | 6/2005 | VanderVelde et al. |
| 6,916,986 | B1 | 7/2005 | Herzog et al. |
| 6,972,367 | B2 | 12/2005 | Federspiel et al. |
| 7,041,897 | B2 | 5/2006 | Herzog |
| 7,041,912 | B2 | 5/2006 | Kadrnoska et al. |
| 7,060,901 | B2 | 6/2006 | Herzog et al. |
| 7,326,863 | B2 | 2/2008 | Herzog |
| 7,411,126 | B2 | 8/2008 | Herzog et al. |
| 2002/0050374 | A1 | 5/2002 | Vander Velde |
| 2003/0016931 | A1 | 1/2003 | Ferris et al. |
| 2003/0047345 | A1 | 3/2003 | Bernard et al. |
| 2003/0089515 | A1 | 5/2003 | Federspiel et al. |
| 2004/0218884 | A1 | 11/2004 | Ferris et al. |

FOREIGN PATENT DOCUMENTS

| | | |
|---|---|---|
| EP | 1 284 535 A1 | 2/2003 |
| EP | 1 317 040 A1 | 6/2003 |
| EP | 1 601 075 A2 | 11/2005 |
| FR | 2 406 327 | 5/1979 |
| FR | 2 425 518 | 12/1979 |
| GB | 1021871 | 3/1966 |
| WO | WO 95/28757 | 10/1995 |
| WO | WO 02/18992 A1 | 3/2002 |
| WO | WO 02/29463 A1 | 4/2002 |

OTHER PUBLICATIONS

"FibreGuide® Fiber Management Systems," *ADC Telecommunications, Inc.*, 1st Edition, front cover, pp. 20, 26, 32, and back cover (Mar. 2002).

"Lightpaths, Fibre Optic Management Systems," *Warren & Brown & Staff*, Issue 2, 11 pages (1995).

International Search Report and Written Opinion mailed Nov. 5, 2008.

* cited by examiner

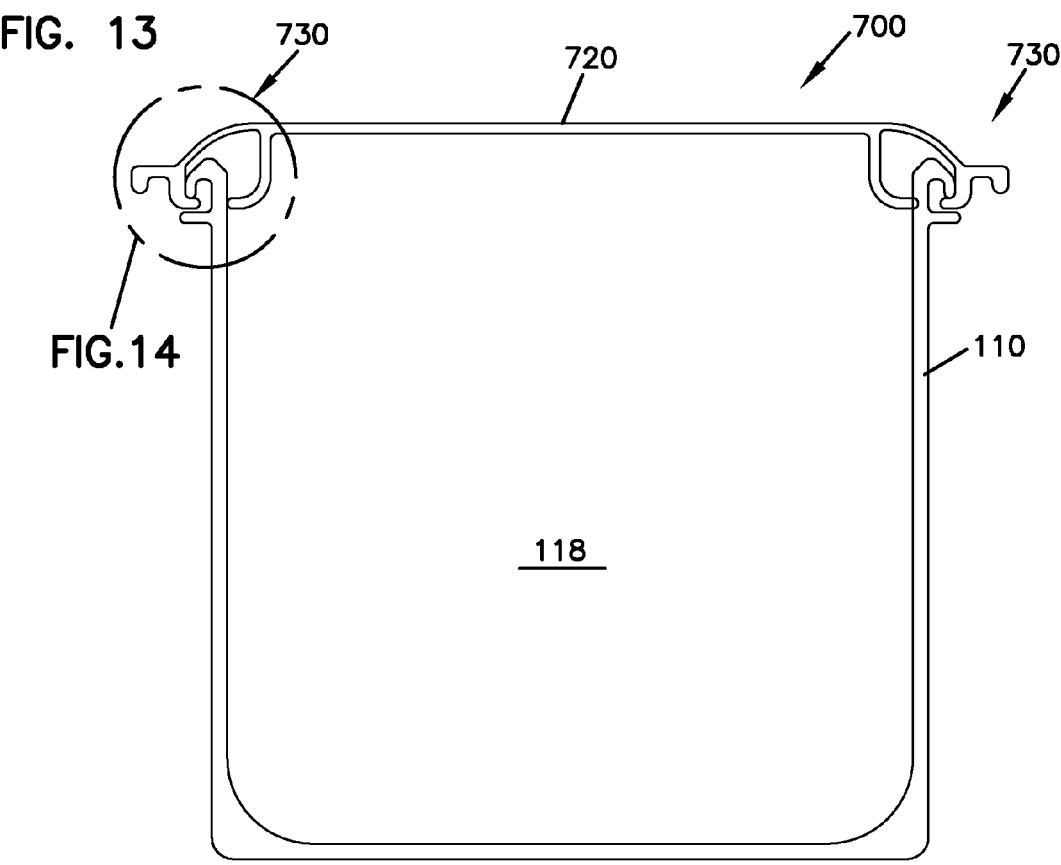
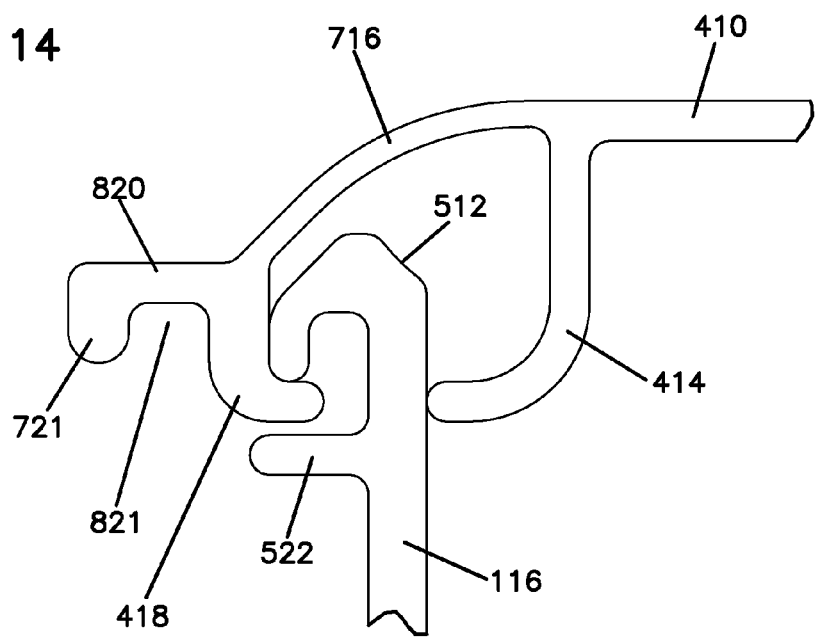

HINGE FOR CABLE TROUGH COVER

RELATED APPLICATION

This application claims the benefit of U.S. patent application Ser. No. 60/953,376 filed on Aug. 1, 2007, the entirety of which is hereby incorporated by reference.

BACKGROUND

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures that carry such equipment, the cable routing can take place in concealed ceiling areas or in any other manner to route cables from one location to another.

When routing optical fibers and other cables such as copper wires, it is desirable that a routing system will be readily modifiable and adaptable to changes in equipment needs. Accordingly, such routing systems include a plurality of components, such as trough members and couplers, for defining the cable routing paths. The trough members are joined together by couplings. U.S. Pat. Nos. 5,067,678; 5,316,243; and 5,752,781 teach cable routing systems that include a plurality of trough members and couplers.

Various concerns arise in the use of trough members. One concern is that trough members are typically U-shaped and therefore have open ends through which debris and other undesirable material, such as tools, hardware, and other debris, can fall onto the fibers running through the trough members. In addition, the open ends can allow fiber to potentially escape from the trough members. Further, even if the trough members include covers to close the open ends, it may be necessary to periodically gain access to the interior portions of the trough members to, for example, add or remove fibers.

It is therefore desirable to provide covers for trough members that reduce debris from entering interior portions of the trough members while still allowing for access to the interior portions of the trough members.

SUMMARY

Embodiments of the present invention are directed to systems and methods for the management and routing of telecommunication cables and, more particularly, to covers for cable trough members. Generally, the covers can be coupled to the trough members to cover the trough members. In addition, the covers can be pivoted with respect to the trough members to provide access to the interior portions of the trough members.

The above summary is not intended to describe each disclosed embodiment or every implementation. The figures and the detailed description that follow more particularly exemplify example embodiments. While certain embodiments will be illustrated and described, the disclosure is not limited to use in such embodiments.

DESCRIPTION OF THE DRAWINGS

FIG. 13 is a side view of another embodiment of a trough system with a cover in a closed position.

FIG. 14 is a side view of a portion of the trough system of FIG. 13 with the cover in the closed position.

DETAILED DESCRIPTION

Embodiments disclosed herein are directed to covers for cable trough members. Generally, the covers can be coupled to the trough members to cover the trough members. In addition, the covers can be pivoted with respect to the trough members to provide access to the interior portions of the trough members. As used herein, the term trough member is used to refer to any trough, fitting, railway, raceway, or similarly configured component including any number of ends. In example embodiments, the trough members can be positioned to extend vertically or horizontally.

Referring now to FIGS. 1-4, an example embodiment of a cable trough system 100 is shown. The system 100 generally includes a trough member 110 and a cover 120. In example embodiments, the cover 120 can be coupled to the trough member 110 by hinge arrangements 130, and the cover 120 can pivot relative to trough member 110 between closed and open positions, as shown in FIGS. 1-4.

Figure 5:
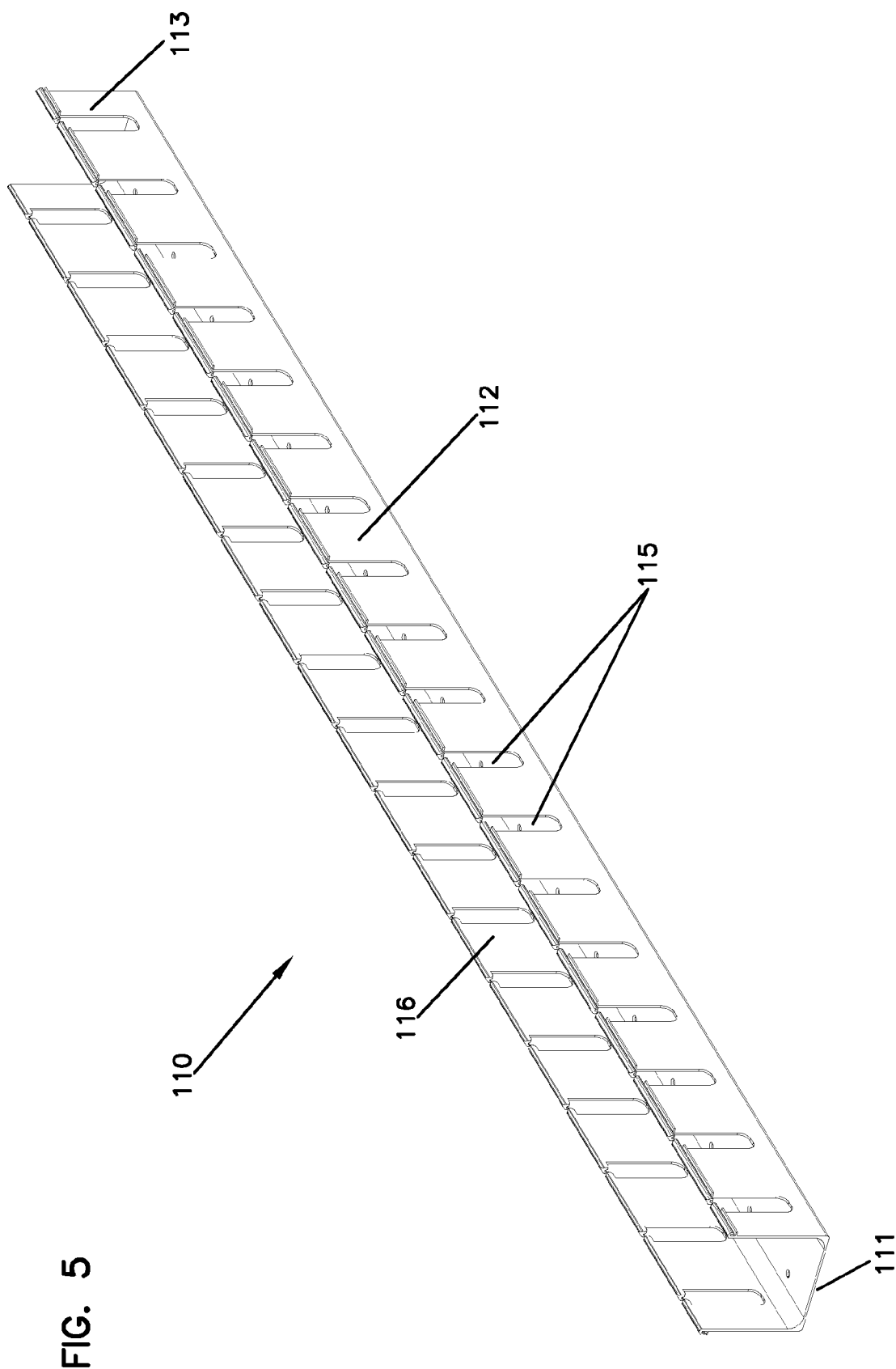
FIG. 5 is a perspective view of a trough member of the trough system of FIG. 1.
Figure 6:
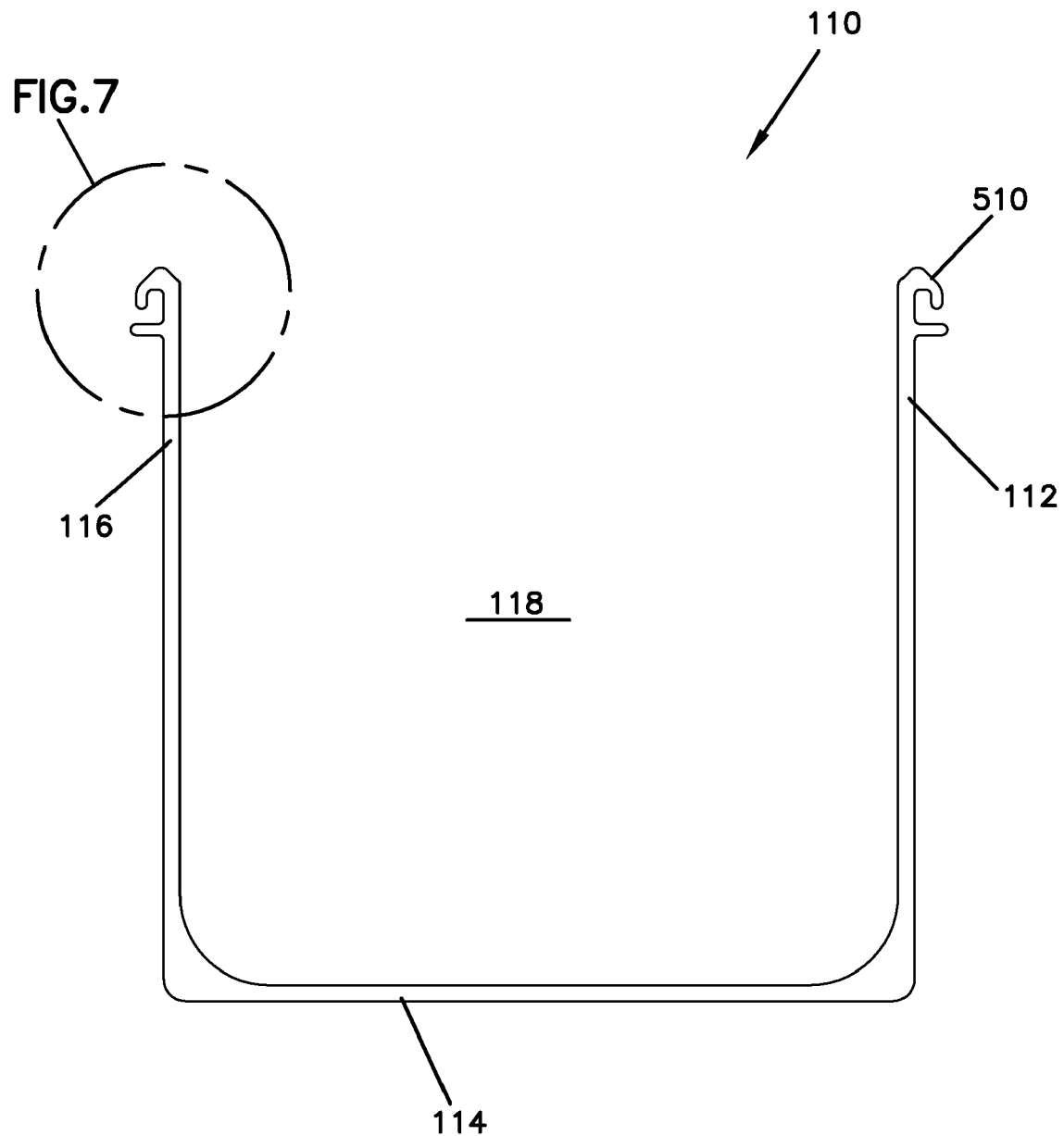
FIG. 6 is an end view of the trough member of FIG. 5.
Figure 7:
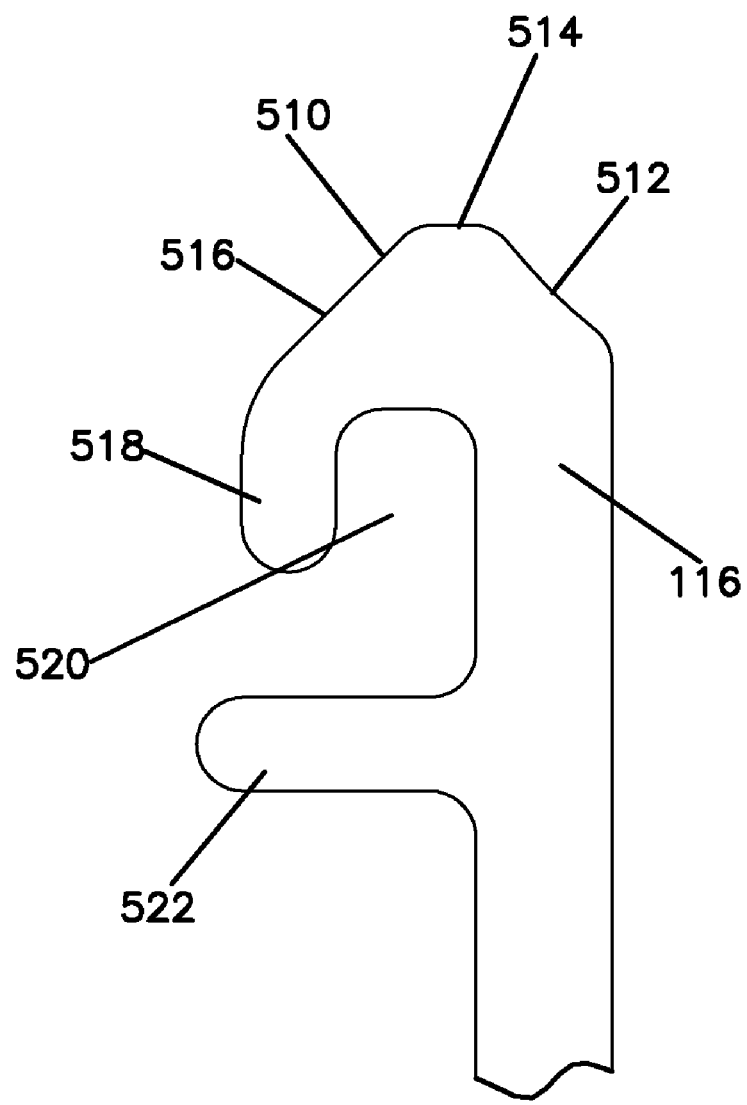
FIG. 7 is an end view of a portion of the trough member of FIG. 6.
Figure 8:
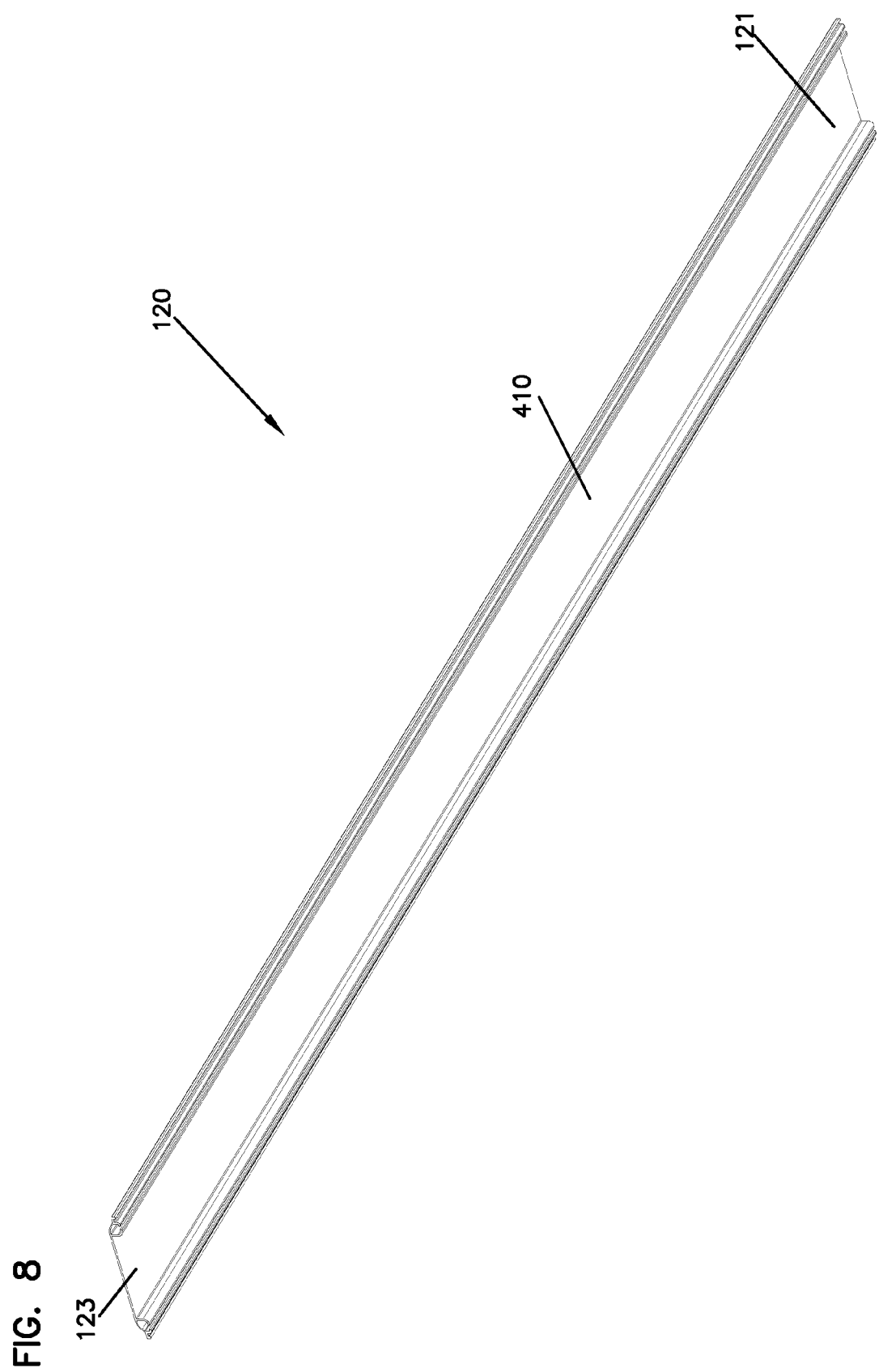
FIG. 8 is a perspective view of a cover of the trough system of FIG. 1.
Figure 9:
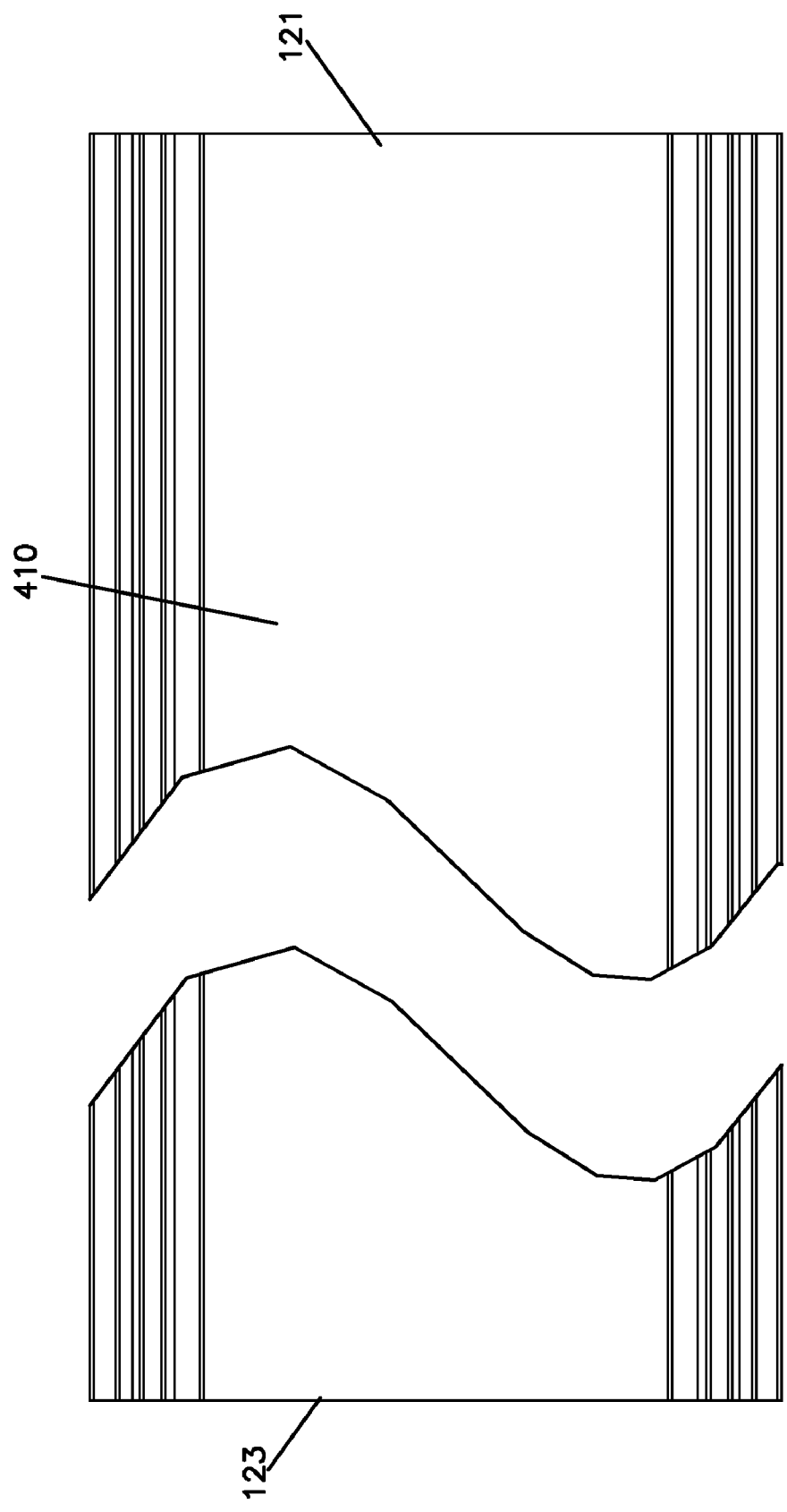
FIG. 9 is a top view of the cover of FIG. 8.
Figure 10:
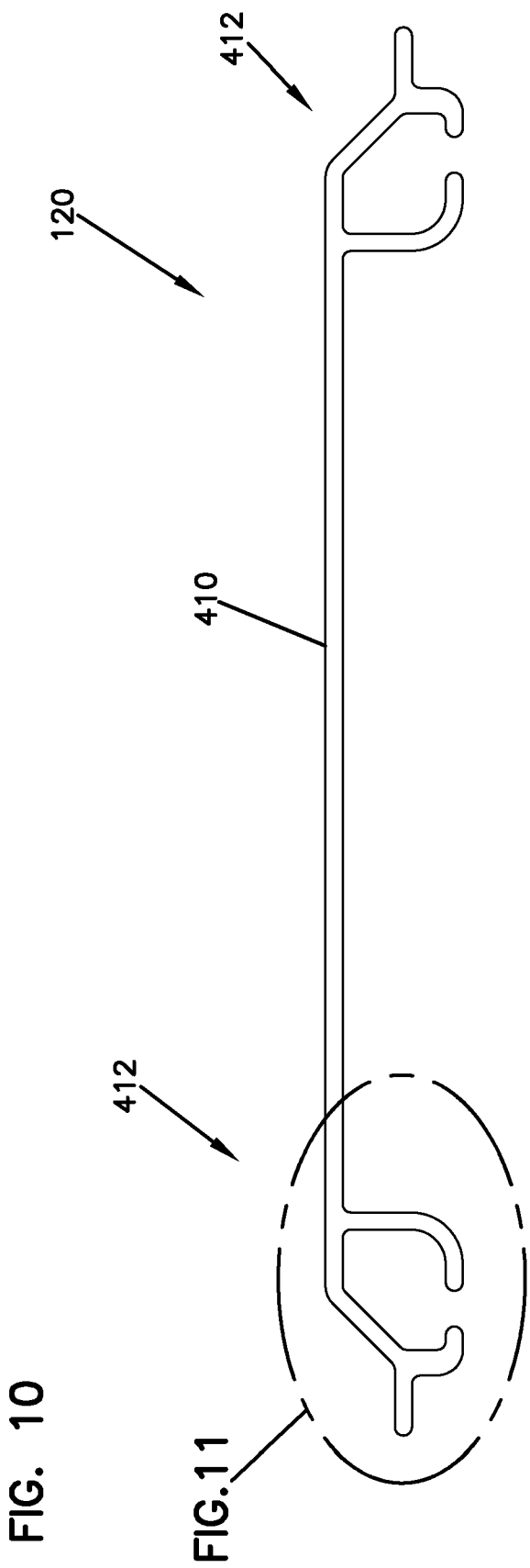
FIG. 10 is an end view of the cover of FIG. 8.
Figure 11:
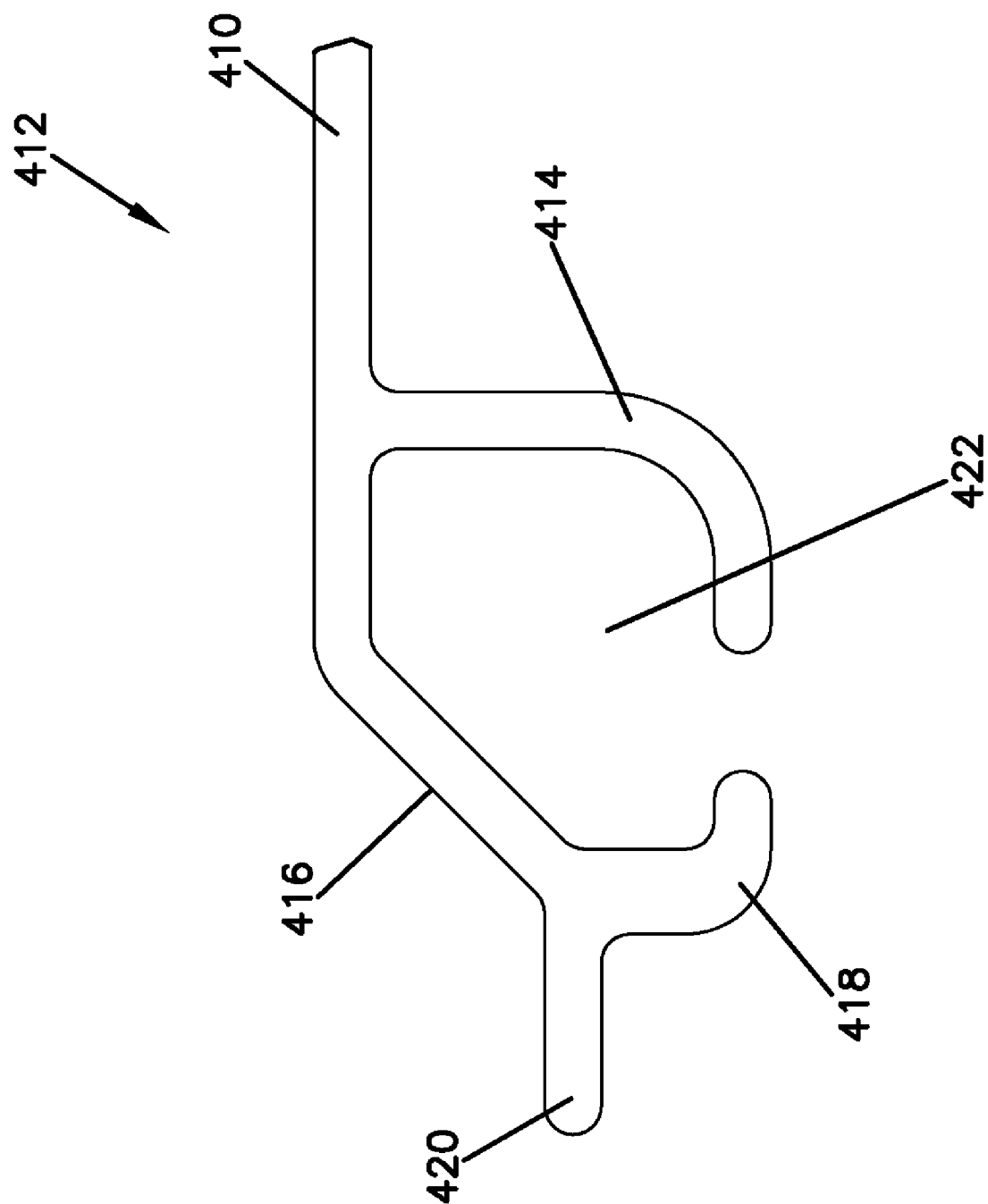
FIG. 11 is an end view of a portion of the cover member of FIG. 10.

Referring now to FIGS. 5-7, the example trough member 110 includes first and second sidewalls 112 and 116 coupled to a third wall 114 generally forming a U-shaped trough with an interior space 118 through which cables such as fiber (not shown) can be run. The trough member 110 extends lengthwise in a vertical or horizontal direction when in use. The trough member 110 extends from a first end 111 to a second end 113. The trough member 110 can be of varying lengths and widths, and can be coupled to other trough members or similar structures to form a cable trough system.

Figure 12:
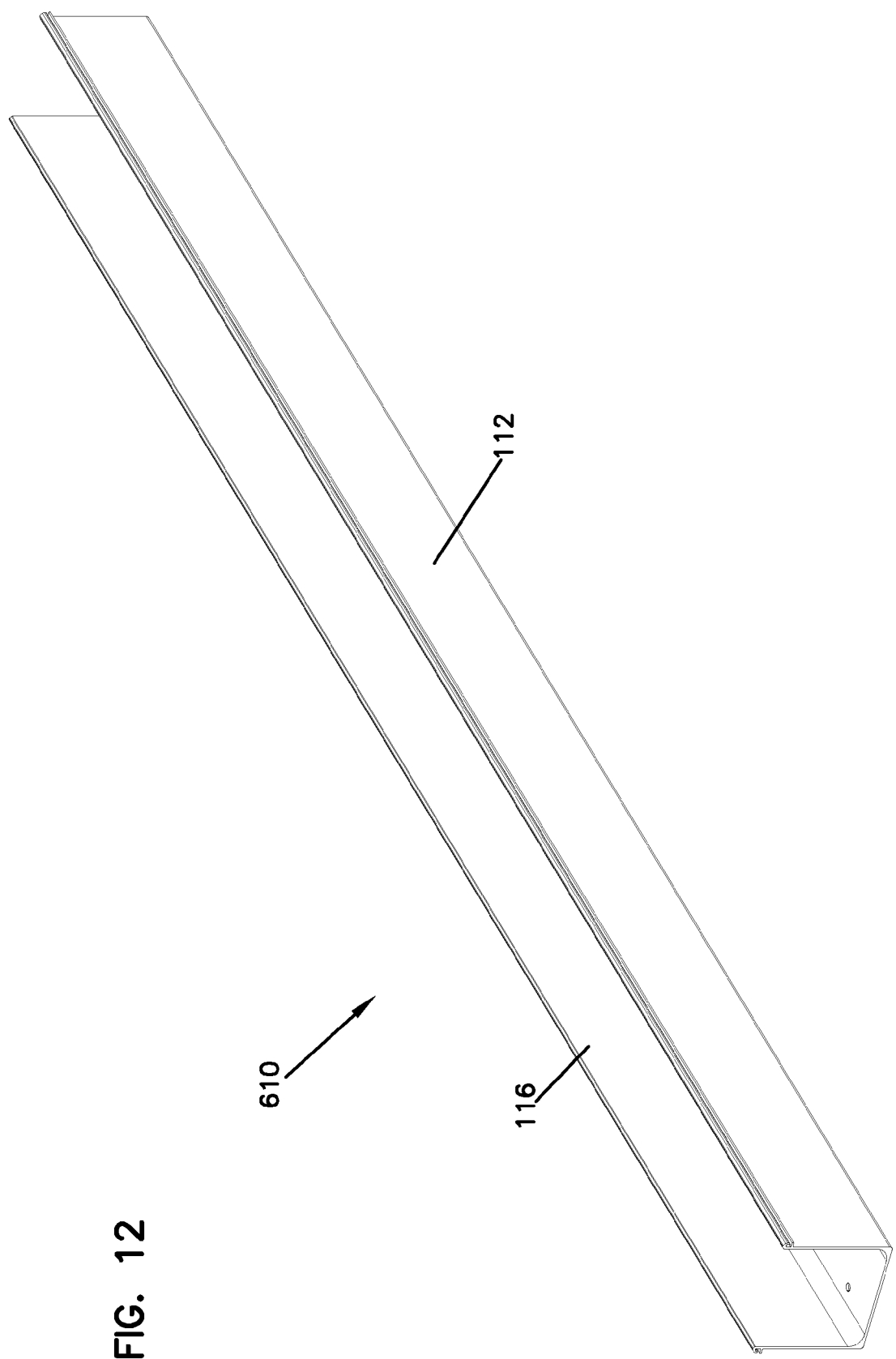
FIG. 12 is a perspective view of another trough member.
Figure 15:
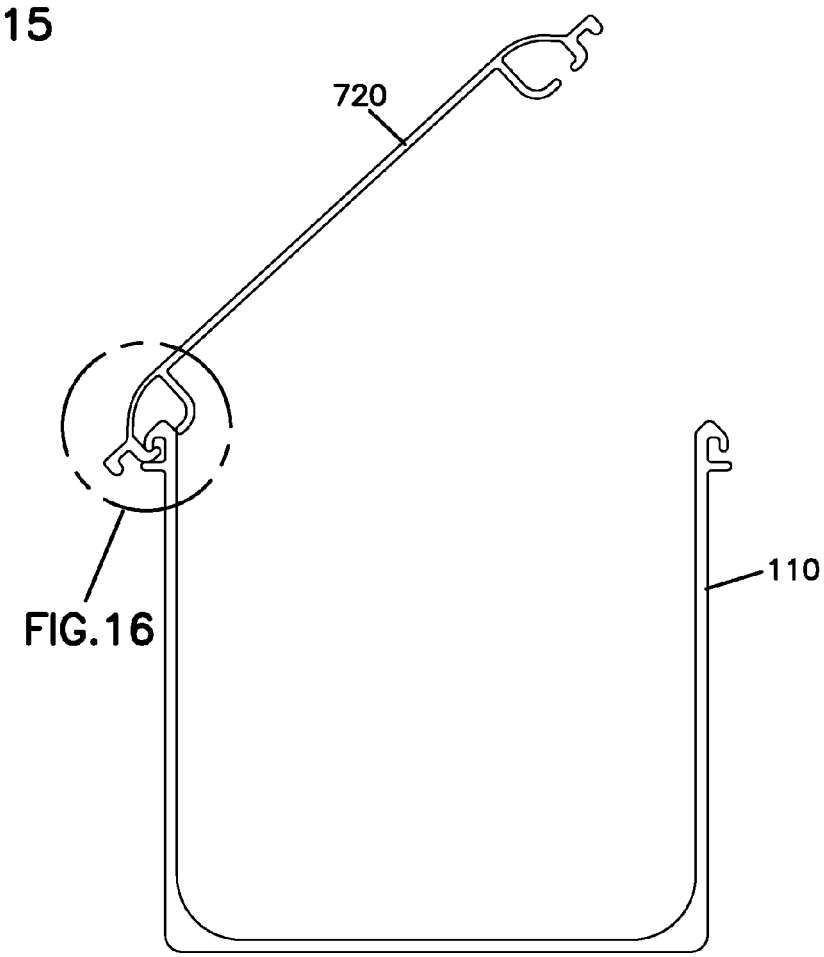
FIG. 15 is a side view of the trough system of FIG. 13 with the cover in a partially opened position.
Figure 16:
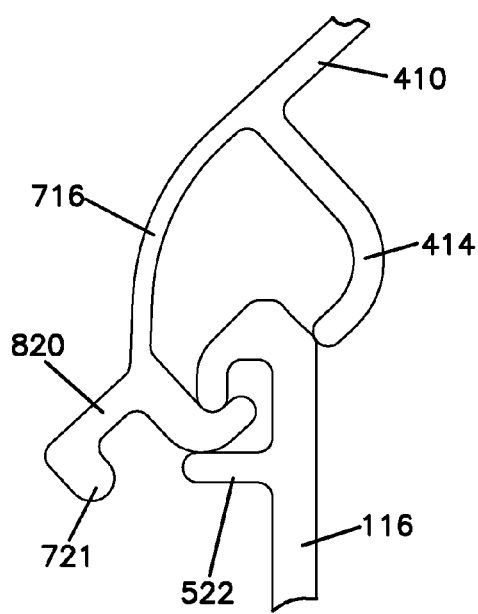
FIG. 16 is a side view of a portion of the trough system of FIG. 15 with the cover in the partially opened position.
Figure 17:
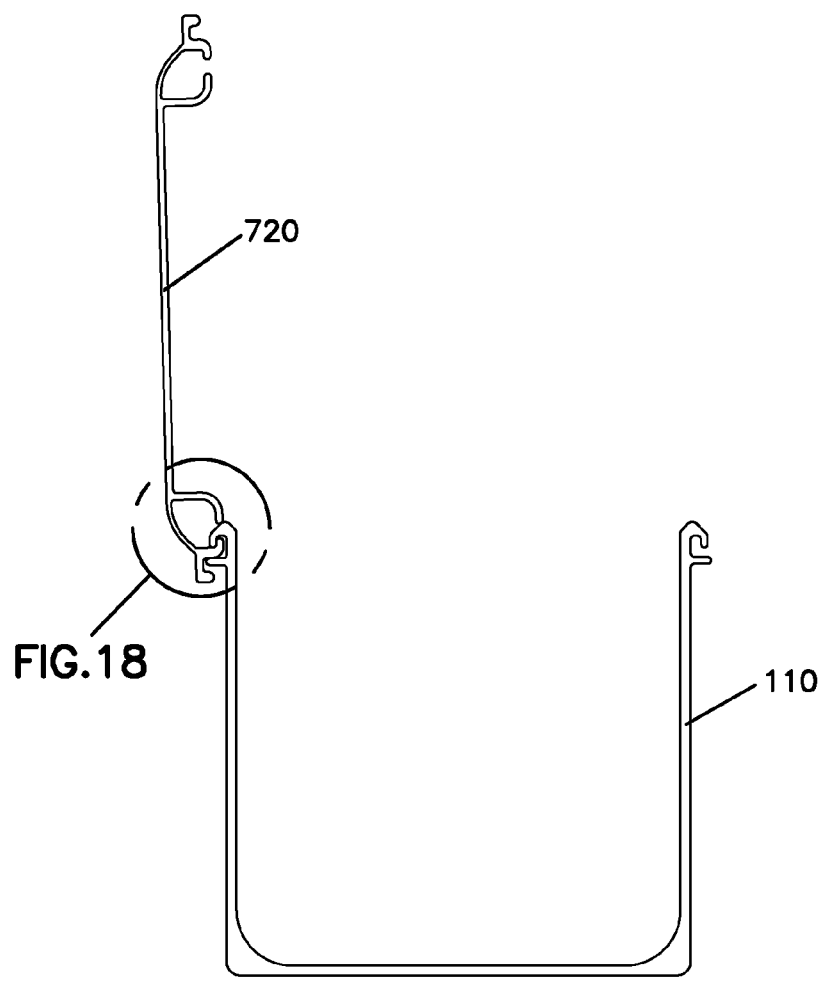
FIG. 17 is a side view of the trough system of FIG. 13 with the cover in a fully open position.
Figure 18:
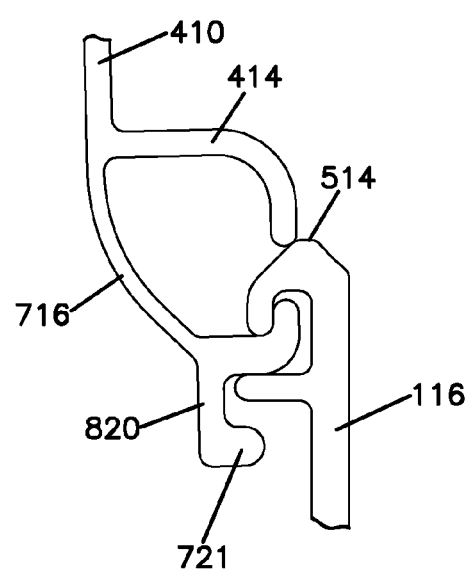
FIG. 18 is a side view of a portion of the trough system of FIG. 17 with the cover in the fully opened position.
Figure 19:
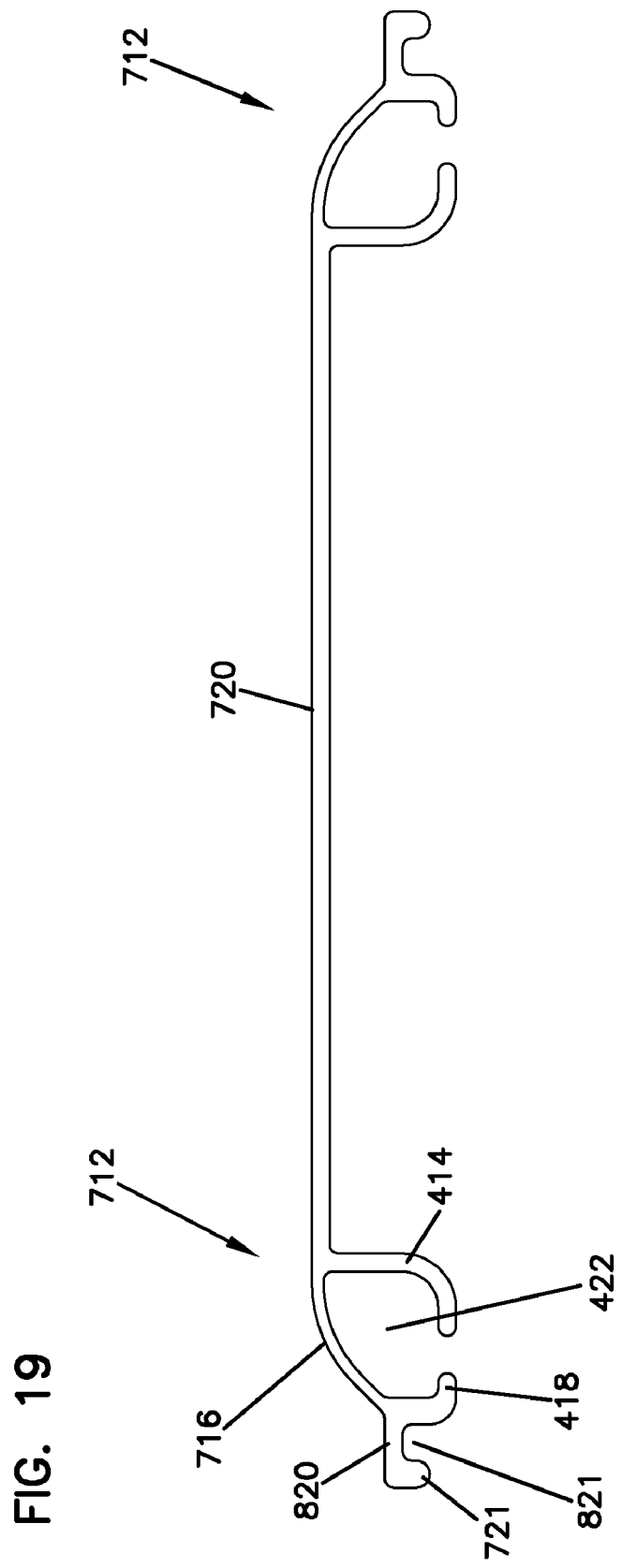
FIG. 19 is an end view of the cover of FIG. 13.

In the example shown, the trough member 110 includes a plurality of slots 115 formed in the sidewalls 112, 116 through which cable can enter or exit the trough member 110. In other embodiments, such as that shown in FIG. 12, a trough member 610 includes sidewalls 112, 116 that are solid. Other configurations are possible.

Referring now to FIGS. 6 and 7, each of the free ends of the sidewalls 112, 116 includes a first hinge portion 510. In example embodiments, each of the first hinge portions 510 allows the cover 120 to be coupled to and pivot about the first hinge portions 510, as described further below. Each first hinge portion 510 includes first, second, and third portions 512, 514, and 516 extending from the sidewalls 112, 116. Each first hinge portions 510 also includes a protrusion 518 extending from the third portion 516. The trough member 110 also includes a side extension member 522 extending outwardly from the sidewalls 112, 116. An interior space 520 is defined by the first, second, and third portions 512, 514, and 516 and the side extension member 522. In example embodiments, the first, second, and third portions 512, 514, and 516 form a hook that partially defines the interior space 520. Also, the first hinge portion 510 of the sidewall 112 is a mirror image of the first hinge portion 510 of the sidewall 116, although other configurations are possible.

Referring now to FIGS. 8-11, the example cover 120 is shown in more detail. The cover 120 includes a planar main body 410. Attached at opposite ends of the main body 410 are second hinge portions 412 that are configured to be coupled to and pivot about the first hinge portions 510 of the trough 110, as described further below.

In example embodiments, the cover 120 extends from the first sidewall 112 to the second sidewall 116 to cover the open end of the trough member 110. Depending on the width of the trough member 110, a width of the cover 120 can be sized to cover the open end. In example embodiments, the width of the cover 120 is 4, 6, or 12 inches, depending on the width of the trough member 110. In alternative embodiments, the cover 120 can be sized to cover only one-half of the open end of the trough member, and a separate cover 120 can be coupled to the opposite sidewall of the trough member 110 to cover the other half of the open end. The cover 120 extends lengthwise from a first end 121 to a second end 123. In example embodiments, the length of the cover 120 (i.e., the distance between ends 121, 123) is between 2 and 8 feet. In one embodiment, the length is approximately 6 feet. Successive covers 120 can be used end to end to cover trough members of longer length, and the cover 120 can be cut to other desired lengths.

Each of the second hinge portions 412 (or referred to as first and second hinge portions) includes an intermediate arm 414 (or referred to as a first member) extending from the main body 410 of the cover 120. Each second hinge portion 412 also includes a first slanted member 416 (or referred to as a second member) extending from the main body at an angle, and another end arm 418 extending from the first member 416. The arms 414, 418 and the first member 416 together define an interior space 422. An extension member 420 extends outwardly from the first member 416 in a direction generally opposite to that of the arms 418. In example embodiments, the second hinge portions are mirror images of one another and are identically constructed, although other configurations are possible.

Figure 2:
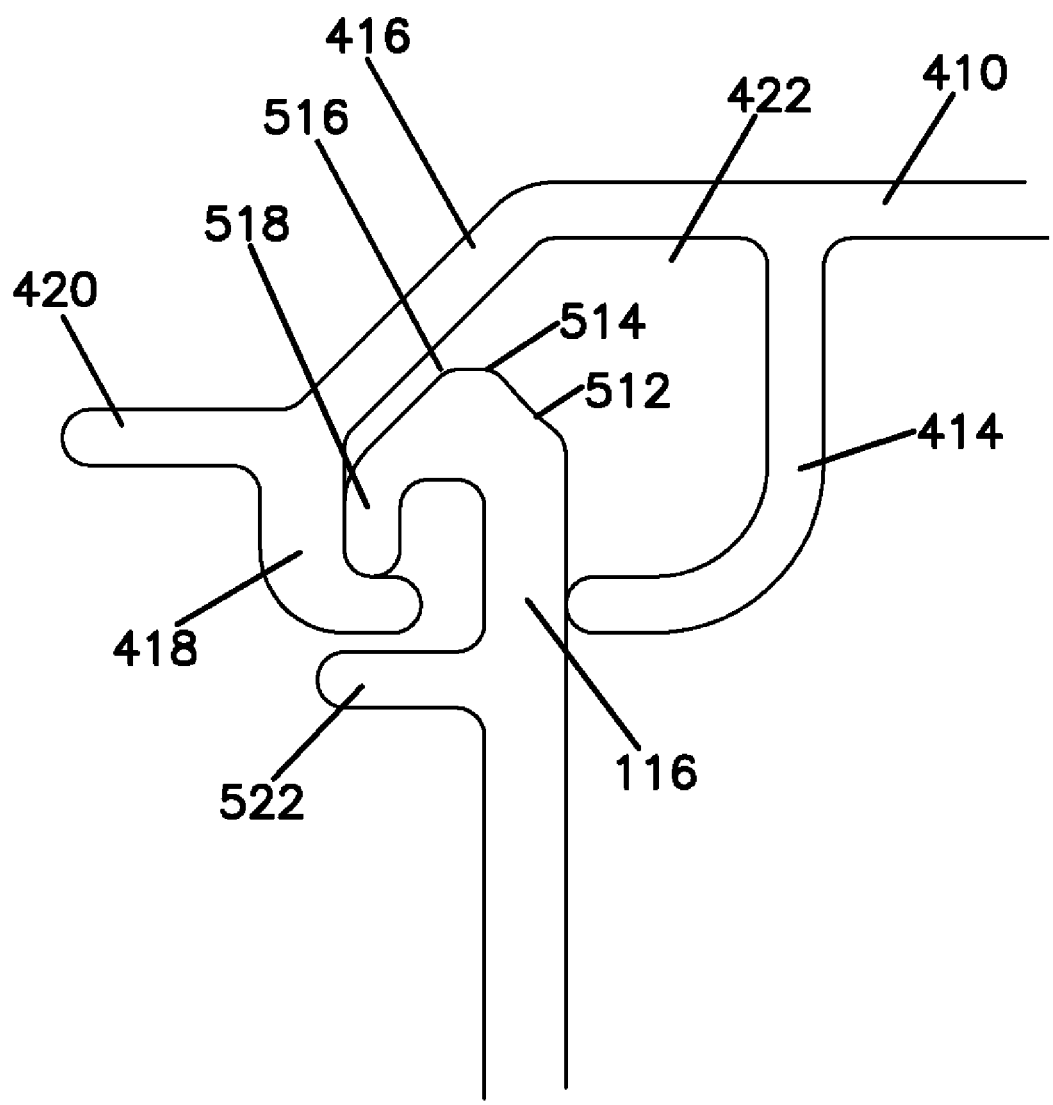
FIG. 2 is a side view of a portion of the trough system of FIG. 1 with the cover in the closed position.
Figure 3:
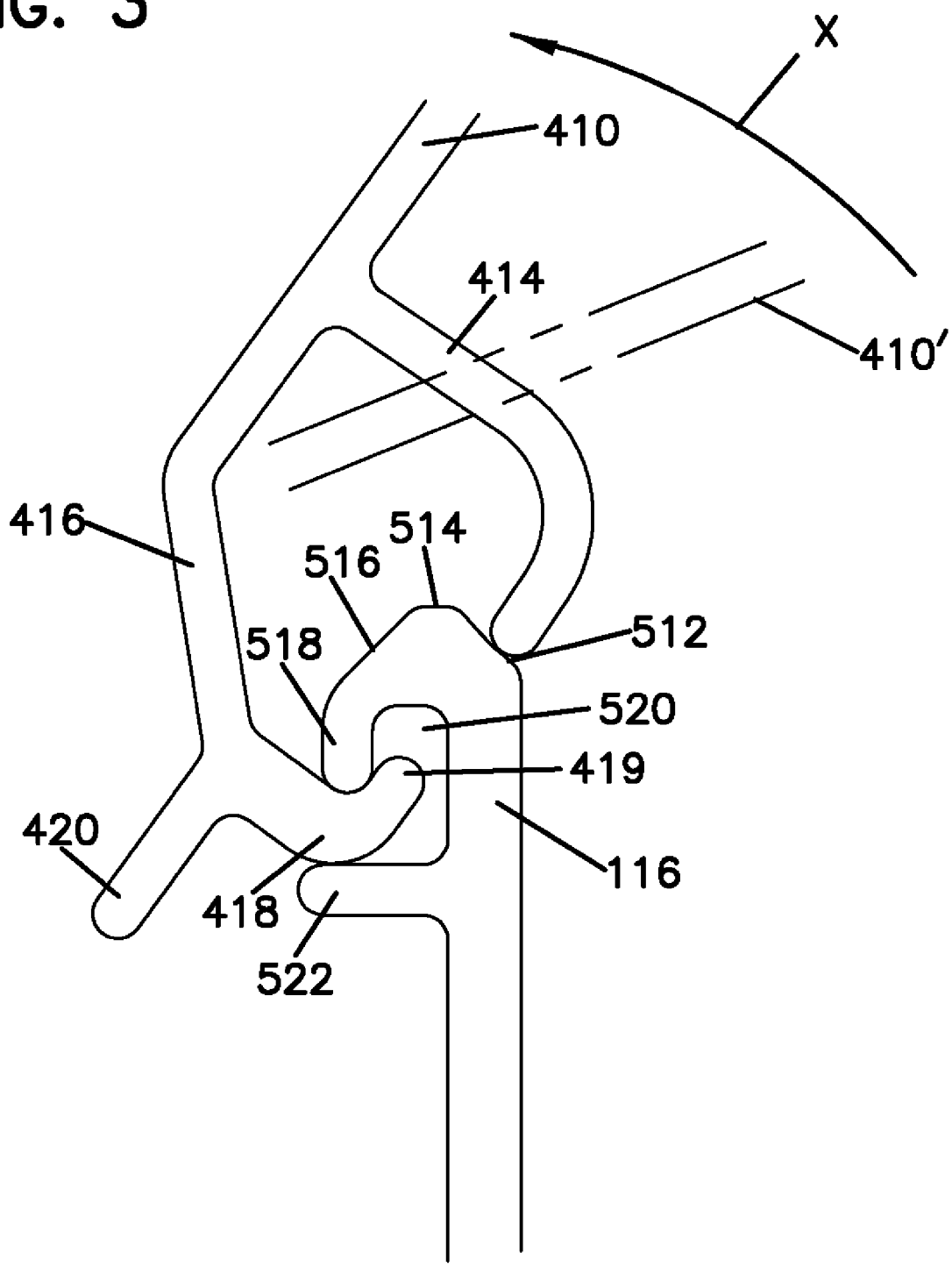
FIG. 3 is a side view of the portion of the trough system of FIG. 2 with the cover in a partially opened position.
Figure 4:
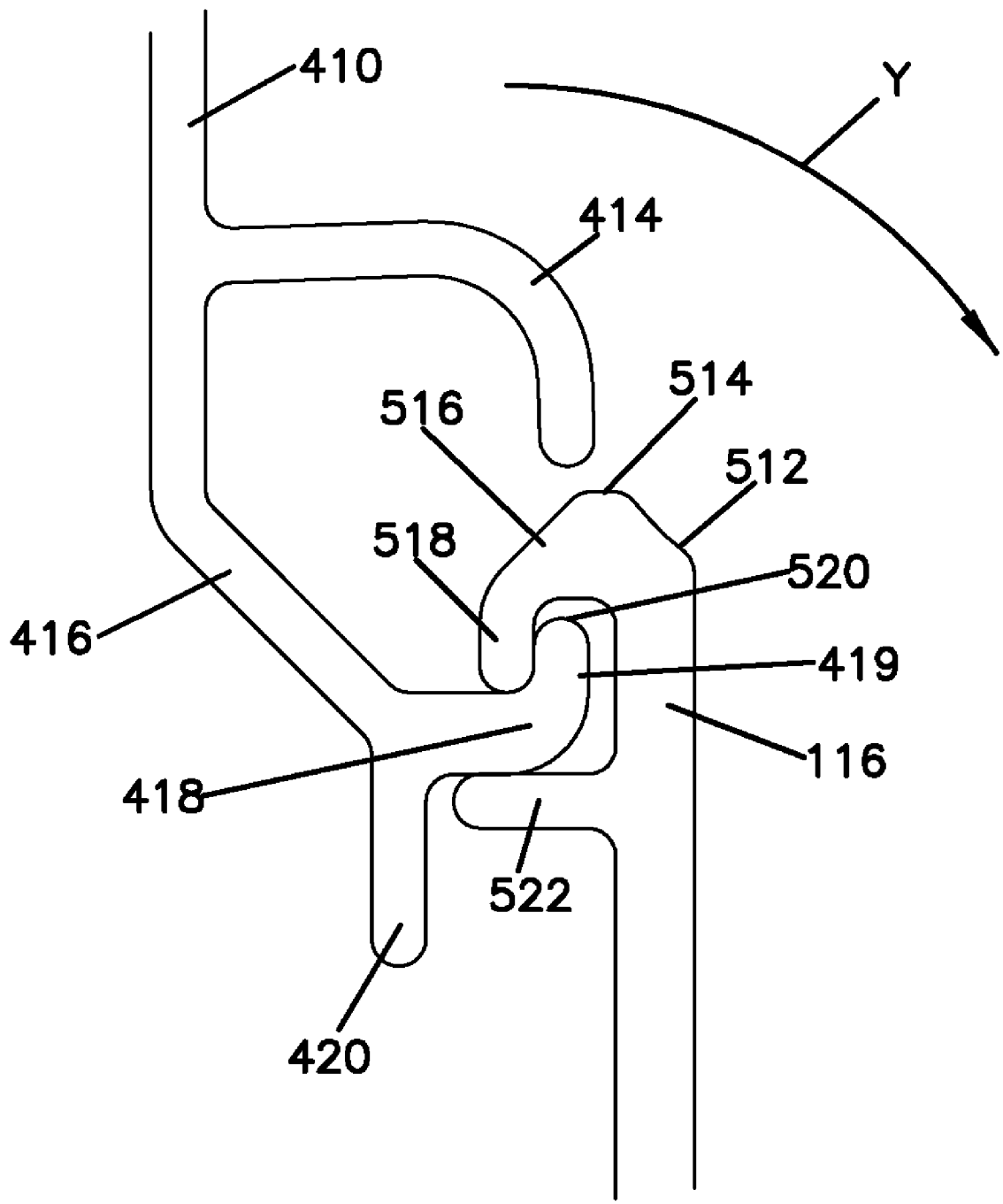
FIG. 4 is a side view of the portion of the trough system of FIG. 2 with the cover in a fully open position.

Referring now to FIGS. 1-4, when the cover 120 is coupled to the trough member 110, the cover 120 can be moved from a closed position (FIGS. 1 and 2) to an open position (FIG. 4).

Figure 1:
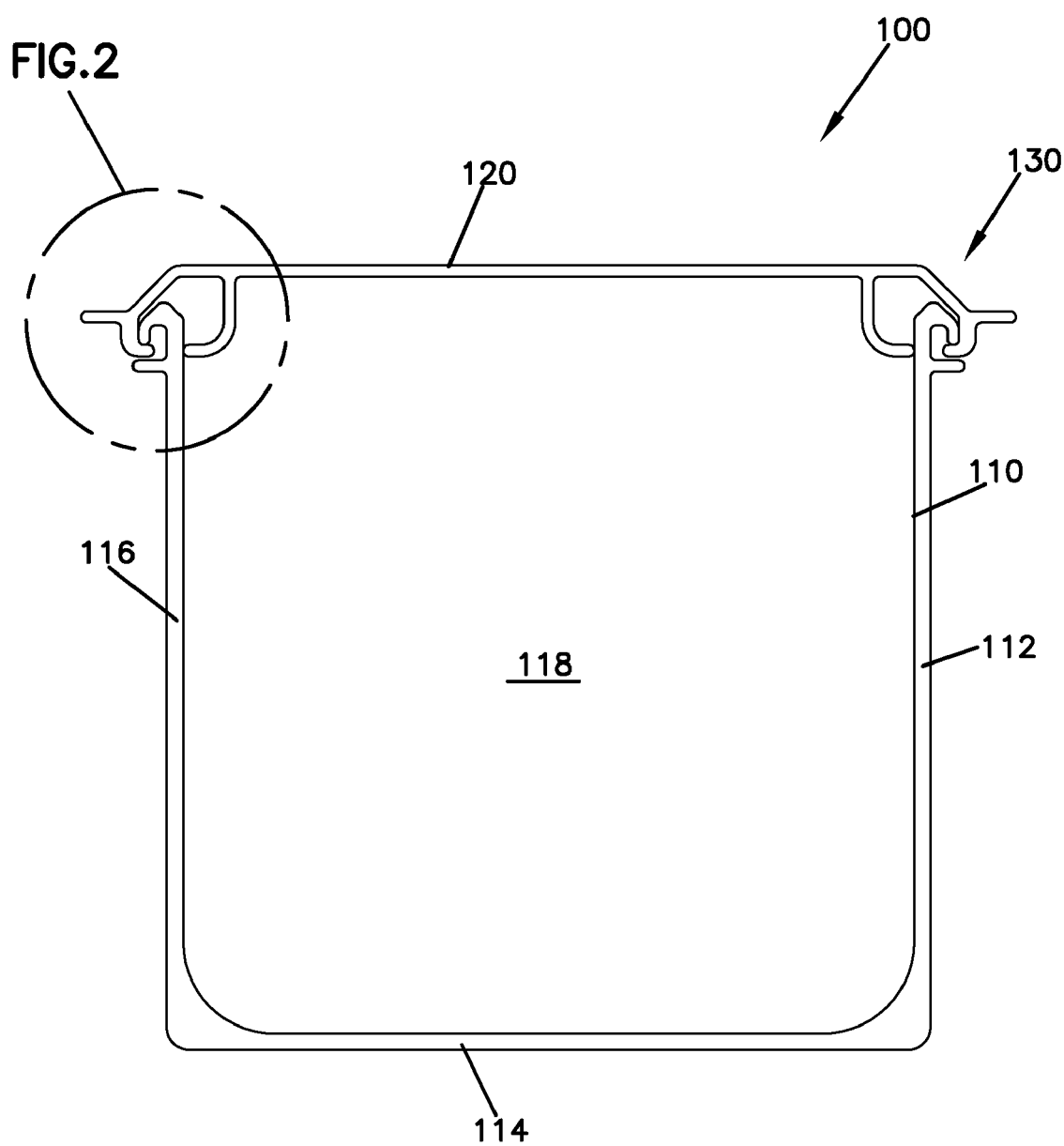
FIG. 1 is a side view of an embodiment of a trough system with a cover in a closed position.

As shown in FIGS. 1 and 2, when the cover 120 is coupled to the trough member 110 in the closed position, the first, second, and third portions 512, 514, and 516 extend into the interior space 422 of each of the second hinge portions 412. The intermediate arm 414 engages the interior surface of the sidewall 116. The engagement of the intermediate arm 414 against the sidewall 116 forces the protrusion 518 into engagement with the end arm 418 of the second hinge portion 412 so that the first hinge portion 510 does not slide out of the interior space 422 of the second hinge portion 412 of the cover 120. In this closed position, the cover 120 extends over the open end of the trough member 110 and thereby protects any components (e.g., fiber cables) positioned in the interior space 118 of the trough member 110.

The cover 120 can be moved from the closed position toward the open position. To accomplish this, one of the second hinge portions 412 of the cover 120 is uncoupled from the first hinge portion 510 of the trough member 110. The extension member 420 of the second hinge portion 412 can be moved away from the intermediate arm 414 until the end arm 418 clears the protrusion 518. The first hinge portion 510 can then be slid between the arms 414, 418 and out of the interior space 422 of the second hinge portion 412. At this point, the cover 120 can be rotated about the opposite first and second hinge portions 412, 510 in a direction X.

As the cover 120 is rotated in the direction X, at the hinging end of the cover 120 shown in FIG. 3, the intermediate arm 414 slides along the sidewall 116 and then the first portion 512 of the first hinge portion 510. The end arm 418 contacts the side extension member 522 and pivots about the protrusion 518. As the end arm 418 pivots, an end 419 of the end arm 418 is received within the interior space 520.

The terminal end of intermediate arm 414 is spaced from the end arm 418 so that as the cover 120 is rotated away from the closed position and the terminal end of intermediate arm 414 slides along the internal surface of the sidewall 116, a biasing force is created which tends to resist further opening and tends to rotate the cover 120 back toward a preferred rest position. The friction fit of the end arm 418 between the side extension member 522 and the protrusion 518 described below also contributes to the biasing force. In one preferred embodiment, the preferred rest position of the cover 120 is where the cover 120 is angled at about 15 degrees from the closed position (see phantom cover rest position 410' shown in FIG. 3). Therefore, if the cover 120 is not held, the cover 120 will not stay at various positions between the closed and open positions. Instead, by action of the biasing force, the cover 120 will revert back to one preferred rest state at 15 degrees from closed where the terminal end of the intermediate arm 414 rests against a vertical portion of the sidewall 116. For example, if the cover 120 is rotated to the position shown in FIG. 3 and then the user lets go of the cover 120, the cover will not remain in that position but will rotate by action of the biasing force back down to a rest position of 15 degrees from the fully closed position (i.e., 410'). When in the fully closed position shown in FIG. 2, the opposite latched end of the cover 120 prevents the biasing force from pivoting the cover 120 into the partial open rest position. The preferred rest position at 15 degrees substantially covers the open side of the trough member 110 while at the same time allows cables to be added or removed from the trough. That the rest position of the cover trough substantially covers the open side of trough member 110 contributes to protecting fragile fiber cable inside the trough.

Referring now to FIG. 4, the cover 120 is shown in the fully open position. In this position, the cover 120 is pivoted so that the intermediate arm 414 has slid along the first and second portions 512, 514 and comes to rest on the third portion 516. Also, the end arm 418 has pivoted about the protrusion 518 until the end 419 of the end arm 418 is fully received within the interior space 520 of the first hinge portion 510. The end 419 of the end arm 418 engages the protrusion 518 to maintain the end arm 418 within the interior space 520. The cover 120 will remain open once it achieves the fully opened position. The dimension of the space between the side extension member 522 and the protrusion 518 relative to the thickness of end arm 418 is chosen so as to create a friction force to initially resist the insertion of end arm 418 between the side extension member 522 and the protrusion 518 during rotation of the cover 120 away from the closed position. When the cover reaches its fully open position, the friction fit of end arm 418 between the side extension member 522 and the protrusion 518 holds the cover in its fully open position with the terminal end of intermediate arm 414 propped against a detent formed by outwardly slanted portion 516 as shown in FIG. 4.

To close the cover 120, the cover 120 is pivoted in a direction Y opposite to that of the direction X until the intermediate arm 414 slides over the second and first portions 514, 512 and the sidewall 116. Also, the end arm 418 pivots about the protrusion 518 until the opposite second hinge portion 412 reaches the corresponding end of the opposite sidewall. The end arm 418 can then be bowed slightly outwardly with respect to the intermediate arm 414 to allow the first hinge portion 510 to be received within the interior space 422 of the second hinge portion 412 until the cover 120 reaches the closed position, as shown in FIG. 1.

An example method of assembling the trough system 100 is as follows. Initially, the second hinge portions 412 of the cover 120 are positioned adjacent to the respective ends of the trough member 110. The cover 120 is then pressed towards the trough member 110 so that each of the end arms 418 contacts and slides along the third portion 516 and the protrusion 518 until the end arm 418 is received in the interior spaces 520. Also, each of the intermediate arms 414 slides along the first portion 512 and the sidewall 112, 116 until each of the second hinge portions 412 is fully seated on each respective sidewall, as shown in FIG. 1. Once the cover 120 is coupled to the trough member 110, the cover 120 can be pivoted between the closed and open positions, as described above.

Referring now to FIGS. 13-19, an example embodiment of another cable trough system 700 is shown. The system 700 generally includes the trough member 110 and a cover 720. The cover 720 is similar to that of the cover 120 described above, in that the cover 720 can be coupled to the trough member 110 by hinge arrangements 730, and the cover 720 can pivot relative to trough member 110 between closed and open positions, as shown in FIGS. 13-18.

The cover 720 includes second hinge portions 712. Each of the second hinge portions 712 includes a member 716 that extends in a curved configuration from the main body 410 of the cover 720 to an extension member 820. The member 716 includes a reduced thickness as compared to other portions of the cover 720. The curvature of the member 716 and the reduced thickness thereof allow a user to more easily slightly bend the member 716 outwardly away from the sidewalls 112, 116 of the trough member 110 as the user uncouples the arm 418 of the second hinge portion 712 from the first hinge portion 510 of the trough member 110.

A member 721 extends generally perpendicularly from the extension member 820. In example embodiments, a space 821 is formed between the member 721, the extension member 820, and the arm 418 of the cover 720. In some embodiments, a width of the space 821 is sized to receive at least a portion of a user's finger (e.g., a thumb, index, or middle finger) into the space 821 so that the user can grasp the cover 720 when pivoting the cover 720 between closed and open positions. Other configurations are possible.

In example embodiments, the trough member 110 and the covers 120, 720 are extruded from a synthetic thermoplastic polymer such as an acrylonitrile-butadiene-styrene(ABS)/polycarbonate blend. Other manufacturing methods (e.g., molding) and materials can also be used.

The various embodiments described above are provided by way of illustration only and should not be construed to limiting. Those skilled in the art will readily recognize various modifications and changes that may be made to the embodiments described above without departing from the true spirit and scope of the disclosure.

What is claimed is:

1. A cover for a cable trough system, the cover comprising:
   a main body that defines a planar surface with a first end and a second end;
   a first hinge portion coupled to the first end of the main body, and a second hinge portion coupled to the second end of the main body, wherein each of the first and second hinge portions includes:
      a first member that extends to an end positioned to contact an inner surface of a wall of a trough member;
      a second member that defines an arm that is positioned to at least partially contact the wall of the trough member; and
      an extension member that extends from the second member in a direction opposite to that of the arm;
      wherein the first and second members define a space therebetween sized to receive a portion of the trough member; and
   wherein the first hinge portion is a mirror image of the second hinge portion.

2. The cover of claim 1, wherein the cover is coupled to the trough member that extends in a vertical direction.

3. The cover of claim 1, further comprising a member that extends perpendicularly from the extension member.

4. The cover of claim 3, wherein a second space is defined between the member, the extension member, and the second member, the second space being sized to receive at least a portion of a user's finger.

5. The cover of claim 3, further comprising a curved member that extends from the main body to the second member.

6. The cover of claim 5, wherein the curved member includes a reduced thickness.

7. The cover of claim 1, further comprising a curved member that extends from the main body to the second member.

8. The cover of claim 7, wherein the curved member includes a reduced thickness.

9. A cover for a cable trough system, the cover comprising:
   a main body that defines a planar surface with a first end and a second end;
   a first hinge portion coupled to the first end of the main body, and a second hinge portion coupled to the second end of the main body, wherein each of the first and second hinge portions includes:
      a first member that extends to an end positioned to contact an inner surface of a wall of a trough member;
      a second member that defines an arm that is positioned to at least partially contact the wall of the trough member;
      an extension member that extends from the second member in a direction opposite to that of the arm;
      a curved member that extends from the main body to the second member, wherein the curved member includes a reduced thickness; and
      a member that extends perpendicularly from the extension member;
      wherein the first and second members define a space therebetween sized to receive a portion of the trough member; and wherein a second space is defined between the member, the extension member, and the second member, the second space being sized to receive at least a portion of a user's finger; and wherein the first hinge portion is a mirror image of the second hinge portion.

10. A cable trough system, the system comprising:
a trough member including a base wall and first and second sidewalls extending from the base wall to form a trough; and
a cover including:
   a main body that defines a planar surface with a first end and a second end;
   a first hinge portion coupled to the first end of the main body, and a second hinge portion coupled to the second end of the main body, wherein each of the first and second hinge portions includes:
      a first member that extends to an end positioned to contact an inner surface of the first sidewall of the trough member;
      a second member that defines an arm that is positioned to at least partially contact the first sidewall of the trough member; and
      an extension member that extends from the second member in a direction opposite to that of the arm;
      wherein the first and second members define a space therebetween sized to receive a portion of the first sidewall of the trough member; and
   wherein the first hinge portion is a mirror image of the second hinge portion.

11. The system of claim 10, wherein the first sidewall of the trough member includes a trough hinge portion, the trough hinge portion having a hook member and a side extension member that extends from the first sidewall, the hook member and the side extension member defining a second space into which extends a portion of the second member of the cover.

12. The system of claim 11, wherein the hook member and the side extension member extend from the first sidewall in a direction away from the second sidewall of the trough member.

13. The system of claim 12, wherein the end of the first member of the first hinge portion of the cover rides along an inner surface of the first sidewall as the cover is pivoted from a closed position to an open position about the first hinge portion of the cover and the trough hinge of the first sidewall of the trough member.

14. The system of claim 13, wherein the end of the first member rides along the hook member of the trough hinge portion as the cover is pivoted to the open position.

15. The system of claim 11, wherein the second sidewall includes a second trough hinge portion that is a mirror image of the first trough hinge portion.

16. The system of claim 10, wherein the trough member and the cover extend in a vertical direction.

17. The system of claim 10, further comprising a member that extends perpendicularly from the extension member of each of the first and second hinge portions of the cover, wherein a second space is defined between the member, the extension member, and the second member, the second space being sized to receive at least a portion of a user's finger.

18. The system of claim 17, further comprising a curved member that extends from the main body to the second member of each of the first and second hinge portions.

19. The system of claim 18, wherein the curved member includes a reduced thickness.

20. The system of claim 10, further comprising a curved member that extends from the main body to the second member of each of the first and second hinge portions, wherein the curved member includes a reduced thickness.

* * * * *